United States Patent
Chang et al.

(10) Patent No.: US 10,959,281 B2
(45) Date of Patent: Mar. 23, 2021

(54) BEARER MANAGEMENT APPARATUS AND METHOD, AND COMMUNICATION SYSTEM

(71) Applicant: FUJITSU LIMITED, Kawasaki (JP)

(72) Inventors: Ningjuan Chang, Beijing (CN); Haibo Xu, Beijing (CN); Yanling Lu, Beijing (CN); Weiwei Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/598,845

(22) Filed: Oct. 10, 2019

(65) Prior Publication Data

US 2020/0100313 A1   Mar. 26, 2020

Related U.S. Application Data

(60) Division of application No. 15/272,868, filed on Sep. 22, 2016, now Pat. No. 10,512,116, which is a continuation of application No. PCT/CN2014/074270, filed on Mar. 28, 2014.

(51) Int. Cl.
| | |
|---|---|
| *H04W 76/15* | (2018.01) |
| *H04W 76/22* | (2018.01) |
| *H04W 76/36* | (2018.01) |
| *H04W 76/19* | (2018.01) |
| *H04W 76/32* | (2018.01) |
| *H04W 84/04* | (2009.01) |

(52) U.S. Cl.
CPC ........... *H04W 76/22* (2018.02); *H04W 76/15* (2018.02); *H04W 76/19* (2018.02); *H04W 76/32* (2018.02); *H04W 76/36* (2018.02); *H04W 84/045* (2013.01)

(58) Field of Classification Search
None
See application file for complete search history.

(56) References Cited

U.S. PATENT DOCUMENTS

| | | | |
|---|---|---|---|
| 9,526,044 B2 | 12/2016 | Choi et al. | |
| 2014/0241317 A1* | 8/2014 | Jamadagni | H04W 40/36 370/331 |
| 2015/0003435 A1* | 1/2015 | Horn | H04W 28/24 370/338 |

FOREIGN PATENT DOCUMENTS

| | | |
|---|---|---|
| CN | 103533662 A | 1/2014 |
| CN | 103582124 A | 2/2014 |
| WO | 2013104413 A1 | 7/2013 |

OTHER PUBLICATIONS

Notice of Final Rejection issued by the Korean Intellectual Property Office for corresponding Korean Patent Application No. 10-2019-7026137 dated Apr. 9, 2020 with an English translation.
Notice of Preliminary Rejection issued by the Korean Intellectual Property Office for corresponding Korean Patent Application No. 10-2019-7026137 dated Oct. 8, 2019 with an English translation.

(Continued)

*Primary Examiner* — Ayanah S George
(74) *Attorney, Agent, or Firm* — Myers Wolin, LLC

(57) ABSTRACT

A terminal is capable dual connectivity with a base station, the terminal including: a processor configured to perform a process that change, release, or deactivate a bearer among Secondary Cell Group, and to trigger transmission of a Packet Data Convergence Protocol (PDCP) status report according to the process; and, a transmitter configured to transmit the PDCP status report.

14 Claims, 10 Drawing Sheets

(56) References Cited

OTHER PUBLICATIONS

Alcatel-Lucent et al., "Discussion on the remaining PDCP issues in support of DC", Agenda Item: 7.1.2, 3GPP TSG-RAN WG2 Meeting #85bis, R2-141507, Valencia, Spain, Mar. 31-Apr. 4, 2014.
International Search Report issued for corresponding International Patent Application No. PCT/CN2014/074270, dated Dec. 31, 2014, with English translation attached.
Written Opinions of the International Search Authority issued for corresponding International Patent Application No. PCT/CN2014/074270, dated Dec. 31, 2014, with English translation attached.
Notification of Reasons for Refusal issued by the Japan Patent Office for corresponding Japanese Patent Application No. 2016-559159, dated Sep. 19, 2017, with an English translation.
Fujistu, "Discussion on bearer type switch in dual connectivity", Agenda Item: 7.1.2, 3GPP TSG-RAN WG2 Meeting #85bis, R2-141220, Valencia, Spain, Mar. 31-Apr. 4, 2014.
Samsung, "Dual connectivity, signalling flows remaining issues", Agenda Item: 7.2.1, 3GPP TSG-RAN WG2 Meeting #85, R2-141513, Prague, Czech Republic, Feb. 10-14, 2014.
Huawei et al., "Radio bearer configuration and switch in dual connectivity", Agenda Item: 7.1.2, 3GPP TSG-RAN WG2 Meeting #85bis, R2-141163, Valencia, Spain, Mar. 31-Apr. 4, 2014.
Extended European search report with supplementary European search report and the European search opinion issued by the European Patent Office for corresponding European Patent Application No. 14886900.1, dated Oct. 19, 2017.
KDDI Corporation: "Discussions on reporting SCG-RLF towards MeNB", Agenda Item: 7.1.2, 3GPP TSG-RAN WG2 Meeting #85bis, R2-141200, Valencia, Spain, Feb. 12-16, 2007.
Itri, "Further Discussion on RLF Handling in Dual Connectivity", Agenda Item: 7.1.2, 3GPP TSG-RAN WG2 Meeting #85bis, R2-141345, Valencia, Spain, Mar. 31-Apr. 4, 2014.
3GPP TR 36.842 v12.0.0, 3rd Generation Partnership Project; Technical Specification Group Radio Access Network; Study on Small Cell enhancements for E-UTRA and E-UTRAN; Higher layer aspects (Release 12), Dec. 2013.
Notice of Preliminary Rejection issued by the Korean Intellectual Property Office for corresponding Korean Patent Application No. 10-2016-7027184, dated Apr. 19, 2018, with an English translation.
LG Electronics Inc., "On special cell of SCG for dual connectivity," Agenda item: 7.2.1, 3GPP TSG-RAN2 Meeting #85, R2-140736, Prague, Czech Republic, Feb. 10-14, 2014.
Notice of Preliminary Rejection issued by the Korean Intellectual Property Office for corresponding Korean Patent Application No. 10-2016-7027184, dated Nov. 1, 2018, with an English translation.
Intel Corporation, "PDCP reordering for split bearer", Agenda Item: 7.1.2, 3GPP TSG-RAN WG2 Meeting #85bis, R2-141201, Valencia, Spain, Mar. 31-Apr. 4, 2014.
Communication pursuant to Article 94(3) EPC issued by the European Patent Office for corresponding European Patent Application No. 14 886 900.1-1231, dated Oct. 19, 2018.
First Notification of Office Action and Search Report issued by the China National Intellectual Property Administration for corresponding Chinese Patent Application No. 201480076546.3, dated Feb. 3, 2019, with an English translation.
Second Office Action issued by the European Patent Office for corresponding European patent application No. 14886900.1, dated Jun. 5, 2019.
Notification of Reasons for Refusal issued by the Japan Patent Office for corresponding Japanese Patent Application No. 2018-154920, dated Sep. 10, 2019 with full English translation attached.
NTT Docomo, Inc., "Asymmetric support of U-Plane data split options," 3GPP TSG-RAN WG2 #84, Agenda item: 7.2.2.2, R2-134190, Nov. 11-15, 2013, San Francisco, USA.
Pantech, "PDCP status report via X2 in UP 3C," 3GPP TSG-RAN WG2 Meeting #85bis, Agenda item: 7.1.2, R2-141384(revised from R2-140254), Mar. 31-Apr. 4, 2014, Valencia, Spain.
Second Office Action issued by the China National Intellectual Property Administration dated Sep. 10, 2019 for corresponding Chinese Patent Application No. 201480076546.3 with full English translation attached.
Non-Final Office Action "Election Restriction" issued by the USPTO dated Sep. 28, 2018 for corresponding U.S. Appl. No. 15/272,868.
Non-Final Office Action issued by the USPTO dated Dec. 28, 2018 for corresponding U.S. Appl. No. 15/272,868.
A Notice of Allowance issued by the USPTO dated Jul. 11, 2019 for corresponding U.S. Appl. No. 15/272,868.
Second Notice of Final Rejection issued by the Korean Intellectual Property Office for corresponding Korean Patent Application No. 10-2019-7026137, dated Jul. 30, 2020 with a full English translation.

\* cited by examiner

BEARER MANAGEMENT APPARATUS AND METHOD, AND COMMUNICATION SYSTEM

CROSS REFERENCE TO RELATED APPLICATIONS

This application is a divisional application of U.S. application Ser. No. 15/272,868, which was filed on Sep. 22, 2016 and is a continuation application of International Application PCT/CN2014/074270 filed on Mar. 28, 2014, the entire contents of each are incorporated herein by reference.

TECHNICAL FIELD

The present disclosure relates to a technical field of communications, and particularly, to a bearer management apparatus and method, and a communication system.

BACKGROUND

In a heterogeneous network deployed with small cells, the dual connectivity (DC) technology can be used to increase the throughput of a User Equipment (UE), enhance the mobility robustness, decrease the network signaling overhead, etc.

FIG. 1 is a schematic diagram of making dual connectivity in the relevant art. As illustrated in FIG. 1, a base station (such as an eNB) can configure dual connectivity for a UE in a connected status and having a multi-transceiving function with. When dual connectivity is configured, schedulers on two different eNBs (eNodeBs) are employed to provide radio resources to the UE for data transmission, and the two eNBs are usually connected to each other through a non-ideal backhaul X2 interface.

In which, an eNB retaining an S1-MME interface with a Mobility Management Entity (MME) is referred to as Master eNB (MeNB), and service cells associated with the MeNB constitute a Master Cell Group (MCG); the other eNB, which is only used to provide additional radio resources, is referred to as Secondary eNB (SeNB), and correspondingly, service cells associated with the SeNB constitute a Secondary Cell Group (SCG).

In the Evolved Universal Terrestrial Radio Access Network (E-UTRAN), a bearer refers to a data transmission channel and a configuration thereof, and different bearers may have different configurations to transmit services required by different Qualities of Service (QoS). The bearer on the radio interface is referred to as Radio Bearer (RB), for example a user plane bearer is referred to as Data Radio Bearer (DRB), and a control plane bearer is referred to as Signaling Radio Bearer (SRB). When dual connectivity is configured, the RBs can be classified into three types: MCG bearer, SCG bearer and split bearer.

FIG. 2 is a schematic diagram of a radio protocol stack corresponding to a bearer under dual connectivity. As illustrated in FIG. 2, in the perspective of protocol stack, the MCG bearer refers to a bearer which performs corresponding data transmission only using MeNB resources and to which a radio protocol stack corresponding is only located on the MeNB, the SCG bearer refers to a bearer which performs corresponding data transmission only using SeNB resources and to which a radio protocol stack corresponding is only located on the SeNB, and the split bearer refers to a bearer which uses both MeNB resources and SeNB resources and to which a radio protocol stack corresponding is on both of the MeNB and the SeNB.

As to the UE configured with dual connectivity, the network side can determine the type of the bearer for which the service of the UE is configured according to the network load and the service attribute of the UE, i.e., whether the service of the UE is configured to be transmitted on the MCG bearer, or the SCG bearer, or the split bearer.

On the other hand, in the relevant art, the network supports the addition, modification and release of the DRB through a procedure (RRCConnectionReconfiguration) of radio resource management connection reconfiguration. The configuration (including reconfiguration) of the DRB and the configuration limitation are described as follows:

Evolved Packet System (EPS) bearer identity (eps-BearerIdentity). This parameter is only configured when the DRB is established, and cannot be configured under other condition.
  DRB identity (drb-Identity). This parameter remains unchanged during the presence of the DRB.
  Packet Data Convergence Protocol (PDCP) configuration (pdcp-Config). This parameter must be configured when the DRB is established, selectively configured in a case of handover and RRC reestablishment, and cannot be configured under other condition.
  Radio Link Control (RLC) configuration (rlc-Config). This parameter must be configured when a DRB is established, and selectively configured under other condition.
  Logical channel identity (logicalChannelIdentity). This parameter is only configured when the DRB is established, and cannot be configured under other condition.
  Logical channel configuration (logicalChannelConfig). This parameter must be configured when the DRB is established, and selectively configured under other condition.

Generally, the network side takes the DRB identity as an anchor for the DRB management, including the establishment, modification and release of the RB. In a case where the service site of the UE is changed (e.g., handed over), if the target site and the source site have different versions, it is possible that the target site cannot parse the configuration of the eNB by the source site. At that time, the target site will adopt a full configuration, and the network side takes the EPS bearer identity as an anchor for the RB management, including the establishment and release of the RB.

In addition, when dual connectivity is configured, the MeNB and the SeNB independently maintain the configuration of the logical channel, including independently configuring the logical channel identity. That is, the MeNB and the SeNB can configure different RBs of the UE with the same or different logical channel identities.

For example, in FIG. 2, the logical channel identities corresponding to bearer 1 and bearer 3 are independently configured by the MeNB and the SeNB, respectively, and they may be the same as or different from each other. Similarly, the DRB identity under the scene of dual connectivity may also be independently configured by the MeNB and the SeNB, i.e., the MeNB and the SeNB can configure different RBs of the UE with the same or different DRB identities.

It shall be noted that the above description of the background is merely provided for clear and complete explanation of the present disclosure and for easy understanding by those skilled in the art. And it shall not be understood that the above technical solution is known to those skilled in the art as it is described in the background of the present disclosure.

SUMMARY

However, the inventor finds that in the relevant art, a conversion from the SCG bearer to the MCG bearer, or from the split bearer to the MCG bearer, etc. will occur under some scenes, which causes a data dropout that leads to a service interruption, and currently a seamless bearer conversion cannot be carried out.

The embodiments of the present disclosure provide a bearer management apparatus and method, and a communication system, so as to carry out a seamless bear conversion for a user equipment of dual connectivity.

According to a first aspect of the embodiments of the present disclosure, there is provided a bearer management method applied to a user equipment (UE) configured with dual connectivity, including:

receiving an indication message, sent by a base station, for changing a bearer type of a bearer or releasing the bearer under dual connectivity; and changing the bearer type of the bearer or releasing the bearer according to the indication message.

According to a second aspect of the embodiments of the present disclosure, there is provided a bearer management apparatus configured in a user equipment (UE) configured with dual connectivity, including:

a message receiving unit, configured to receive an indication message, sent by a base station, for changing a bearer type of a bearer or releasing the bearer under dual connectivity; and a configuring unit, configured to change the bearer type of the bearer or release the bearer according to the indication message.

According to a third aspect of the embodiments of the present disclosure, there is provided a bearer management method applied to a user equipment (UE) configured with dual connectivity, including:

releasing a Secondary Cell Group (SCG) portion corresponding to a split bearer; or, releasing corresponding SCG when all bearers associated with an SCG are released.

According to a fourth aspect of the embodiments of the present disclosure, there is provided a bearer management apparatus configured in a user equipment (UE) configured with dual connectivity, including:

a first processing unit, configured to release a Secondary Cell Group (SCG) portion corresponding to a split bearer; or, release or deactivate corresponding SCG when all bearers associated with an SCG are released.

According to a fifth aspect of the embodiments of the present disclosure, there is provided a bearer management method applied to a first base station connected to a user equipment (UE) configured with dual connectivity, including:

detecting that a radio connection fails at the UE configured with dual connectivity; and sending to a second base station a request for releasing an associated Secondary Cell Group (SCG) bearer or a split bearer, so that the second base station releases a corresponding bearer.

According to a sixth aspect of the embodiments of the present disclosure, there is provided a bearer management apparatus configured in a first base station connected to a user equipment (UE) configured with dual connectivity, including:

a detecting unit, configured to detect that a radio connection fails at the UE configured with dual connectivity; and a sending unit, configured to send to a second base station a request for releasing an associated Secondary Cell Group (SCG) bearer or a split bearer, so that the second base station releases a corresponding bearer.

According to a seventh aspect of the embodiments of the present disclosure, there is provided a bearer management method applied to a second base station connected to a user equipment (UE) configured with dual connectivity, including:

receiving a request, sent by a first base station, for releasing an associated Secondary Cell Group (SCG) bearer or a split bearer; and releasing a corresponding bearer according to the request for releasing.

According to an eighth aspect of the embodiments of the present disclosure, there is provided a bearer management apparatus configured in a second base station connected to a user equipment (UE) configured with dual connectivity, including:

a receiving unit, configured to receive a request, sent by a first base station, for releasing an associated Secondary Cell Group (SCG) bearer or a split bearer; and a releasing unit, configured to release a corresponding bearer according to the request for releasing.

According to a ninth aspect of the embodiments of the present disclosure, there is provided a communication system, including:

a user equipment (UE) configured with dual connectivity, configured to receive an indication message, sent by a base station, for changing a bearer type of a bearer or releasing the bearer under dual connectivity; change the bearer type of the bearer or release the bearer according to the indication message; and send a response message to the base station;

or, configured to release a Secondary Cell Group (SCG) portion corresponding to a split bearer after a Radio Resource Control (RRC) connection reestablishment procedure is triggered;

or, configured to release corresponding SCG resource when all bearers associated with an SCG are released.

According to a tenth aspect of the embodiments of the present disclosure, there is provided a communication system, including:

a first base station, configured to detect that a radio connection fails at a user equipment (UE) configured with dual connectivity; and send to a second base station a request for releasing an associated Secondary Cell Group (SCG) bearer or a split bearer; and a second base station, configured to receive the request, sent by the first base station, for releasing the associated SCG bearer or the split bearer; and release a corresponding bearer according to the request for releasing.

According to another aspect of the embodiments of the present disclosure, there is provided a computer readable program, when being executed in a user equipment (UE), the program enables a computer to perform, in the UE, the aforementioned bearer management method.

According to still another aspect of the embodiments of the present disclosure, there is provided a storage medium which stores a computer readable program, the computer readable program enables a computer to perform, in a user equipment (UE), the aforementioned bearer management method.

According to still another aspect of the embodiments of the present disclosure, there is provided a computer readable program, when being executed in a base station, the program enables a computer to perform, in the base station, the aforementioned bearer management method.

According to still another aspect of the embodiments of the present disclosure, there is provided a storage medium which stores a computer readable program, wherein the computer readable program enables a computer to perform, in a base station, the aforementioned bearer management method.

The embodiments of the present disclosure have the following beneficial effect: by receiving an indication message, sent by a base station, for changing a bearer type of a bearer or releasing the bearer under dual connectivity, a UE configured with dual connectivity can carry out a seamless bearer conversion.

With reference to the following description and drawings, the particular embodiments of the present disclosure are disclosed in details, and the principles of the present disclosure and the manners of use are indicated. It shall be understood that the scope of the embodiments of the present disclosure is not limited thereto. The embodiments of the present disclosure contain many alternations, amendments and equivalents within the scope of the terms of the appended claims.

Features that are described and/or illustrated with respect to one embodiment may be used in the same way or in a similar way in one or more other embodiments and/or in combination with or instead of the features of the other embodiments.

It shall be emphasized that the term "comprise/include" used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. To facilitate illustrating and describing some parts of the present disclosure, corresponding portions of the drawings may be exaggerated or reduced.

Elements and features depicted in one drawing or embodiment of the present disclosure may be combined with elements and features depicted in one or more additional drawings or embodiments. Moreover, in the drawings, like reference numerals designate corresponding components throughout the several views and may be used to designate corresponding components in more than one embodiment.

DESCRIPTION OF THE EMBODIMENTS

The above and other features of the present disclosure will be apparent with reference to the following description and drawings. In the description and drawings, particular embodiments of the disclosure are disclosed in details as being indicative of some of the ways in which the principles of the present disclosure may be employed, but it shall be understood that the present disclosure is not limited to those embodiments described. Rather more, the present disclosure includes all changes, modifications and equivalents falling within the scope of the appended claims.

Figure 3:
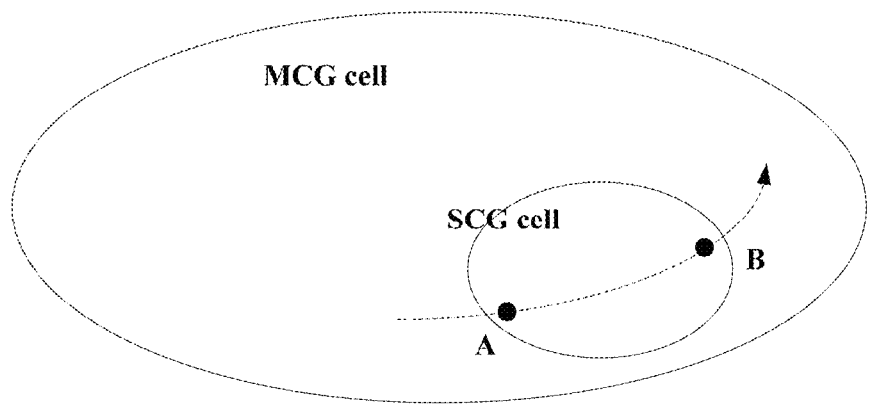
FIG. 3 is a schematic diagram of UE movement in a heterogeneous network of an embodiment of the present disclosure.

Under the scene of dual connectivity, the network side may determine whether to bear the service on an MCG bearer, an SCG bearer or a split bearer according to the network load, the service attribute, and the UE location. FIG. 3 is a schematic diagram of UE movement in a heterogeneous network of an embodiment of the present disclosure. As illustrated in FIG. 3, a moving path of the UE is indicated with a dotted line. When the UE moves to point A, the network side may transfer one or more bearers of the UE onto the SeNB, which causes a conversion from the MCG bearer to the SCG bearer, or from the MCG bearer to the split bearer. When the UE moves to point C, the network side may transfer the one or more bearers of the UE on the SeNB back to the MeNB, which causes a conversion from the SCG bearer to the MCG bearer, or from the split bearer to the MCG bearer.

In the case of a conversion between the bearers, such as from the SCG bearer to the MCG bearer, one way is to release the SCG bearer, and then establish an MCG bearer on the MCG to recover the bearer. This way has a disadvantage that releasing the bearer at first will release the PDCP/RLC entity associated with the bearer, thereby causing a data dropout that leads to a service interruption. In order to avoid the data dropout, a seamless conversion shall be performed for the bearer, i.e., the source SCG bearer is converted to the MCG bearer through a reconfiguration. How to perform such a seamless conversion is a problem to be solved by the present application.

Specifically, the embodiments of the present disclosure mainly solve the following three problems.

Firstly, as described above, the MeNB and the SeNB independently configure logical channel identities corresponding to the bearers. For example in FIG. 2, logical channel identities configured for MCG bearer 1 and SCG bearer 1 by the MeNB and the SeNB respectively are both LCID=1. In that case, if SCG bearer 1 is seamlessly converted to the MCG bearer, the existing mechanism cannot support the modification of the logical channel identity, and there will be a situation that logical channel identities corresponding to the two bearers on the UE are both LCID=1. Thus, when a Medium Access Control (MAC) entity multiplexing/de-multiplexing is performed, the error of the multiplexing/de-multiplexing will be occurred, because the network side and the UE cannot recognize the RB to which the data of the bearers on the logical channels belongs as the logical channels are the same.

Figure 1:
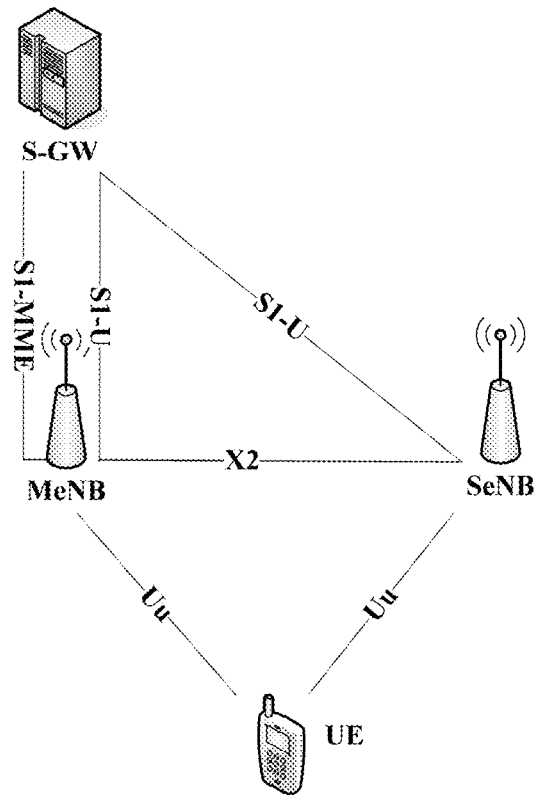
FIG. 1 is a schematic diagram of making dual connectivity in the relevant art.
Figure 2:
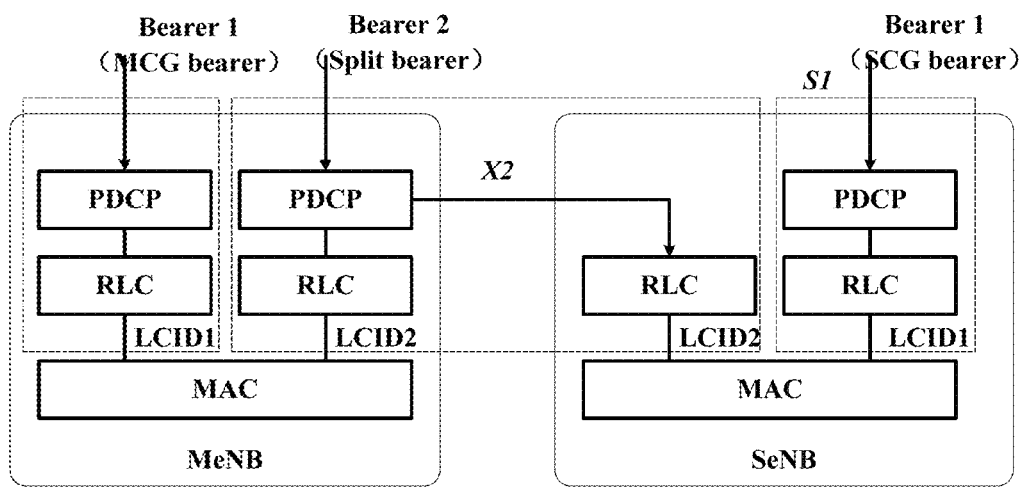
FIG. 2 is a schematic diagram of a radio protocol stack corresponding to a bearer under dual connectivity.

Secondly, assuming that the RB identities are independently configured by the MeNB and the SeNB, for example in FIG. 2, the RB identities configured for MCG bearer 1 and SCG bearer 1 by the MeNB and the SeNB respectively are both DRB=1. In that case, if SCG bearer 1 is seamlessly converted to the MCG bearer, the existing mechanism will take the DRB identity as the anchor when performing a DRB reconfiguration, thus a DRB identity reconfiguration is not supported in that case. As a result, two MCG bearers having the same DRB identity DRB=1 will occur to cause a confusion of DRB identities, and the UE and the network side cannot recognize the two bearers.

Thirdly, if the SCG bearer is converted to the MCG bearer, the MeNB may need to reconfigure the PDCP entity corresponding to the MCG bearer, such as modifying the header compression algorithm, because different configurations of the bearer may be performed by different service sites in consideration of the change of the service site of the bearer. In that case, such a function cannot be supported by the existing mechanism.

Regarding the above problems, the embodiments of the present disclosure will be described in details as follows.

Embodiment 1

Figure 4:
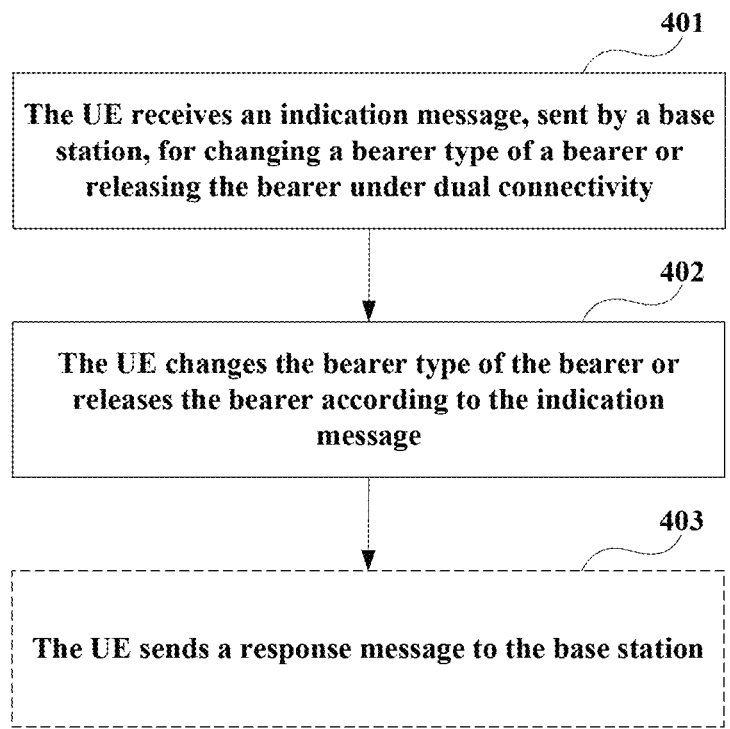
FIG. 4 is a schematic diagram of a flow of a bearer management method of Embodiment 1 of the present disclosure.

This embodiment of the present disclosure provides a bearer management method applied to a UE configured with dual connectivity. FIG. 4 is a schematic diagram of a flow of a bearer management method of Embodiment 1 of the present disclosure. As illustrated in FIG. 4, the method includes:

step 401: the UE receives an indication message, sent by a base station, for changing a bearer type of a bearer or releasing the bearer under dual connectivity; and step 402: the UE changes the bearer type of the bearer or releases the bearer according to the indication message.

As illustrated in FIG. 4, the method may further include:

step 403: the UE sends a response message to the base station.

In this embodiment, the change of the bearer type may include a change from MCG bearer to SCG bearer, a change from SCG bearer to MCG bearer, a change from MCG bearer to split bearer, and a change from SCG 1 bearer to SCG 2 bearer (a change of SCG bearers in different SCGs). But the present disclosure is not limited thereto, and the specific scene can be determined according to the actual conditions.

In this embodiment, the base station may be one of those making dual connectivity with the UE, such as an MeNB or an SeNB, but the present disclosure is not limited thereto, and the specific base station may be determined according to the actual conditions.

In one embodiment, the indication message includes first configuration information configured or reconfigured by the base station for a logical channel identity corresponding to the bearer; and the method further includes: configuring or reconfiguring the logical channel identity corresponding to the bearer according to the first configuration information.

Figure 5:
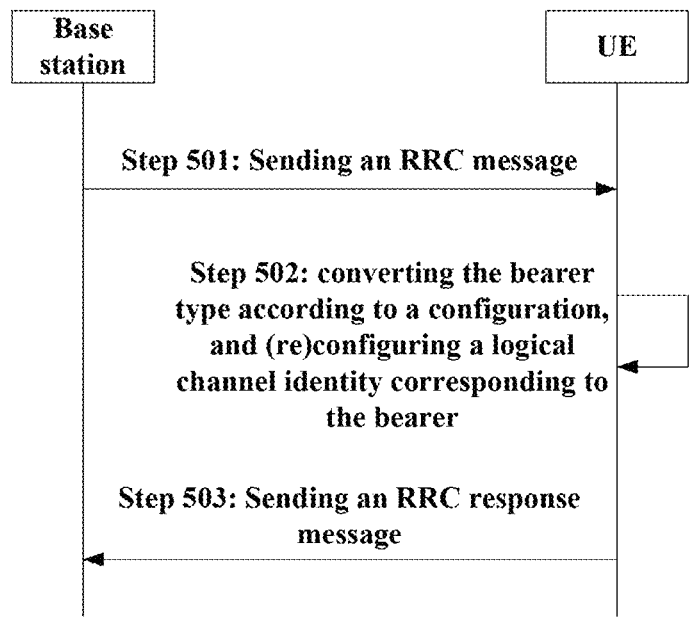
FIG. 5 is a schematic diagram of another flow of a bearer management method of Embodiment 1 of the present disclosure.

FIG. 5 is a schematic diagram of another flow of a bearer management method of Embodiment 1 of the present disclosure. As illustrated in FIG. 5, the method includes:

step 501: a base station sends a Radio Resource Control (RRC) message for changing a bearer type under dual connectivity, and reconfiguring a bearer of a changed bearer type, the RRC message containing first configuration information that includes information of (re)configuration of a logical channel identity corresponding to the bearer by the base station;

step 502: UE receives the RRC message of step 501, converts the bearer type according to a configuration, and (re)configures the logical channel identity corresponding to the bearer according to the first configuration information;

step 503: the UE returns an RRC response message.

In this embodiment, the first configuration information may include logical ChannelIdentity in an information element DRB-ToAddMod. In the perspective of the existing protocol, the method is described as follows:

```
DRB-ToAddMod ::= SEQUENCE {
    eps-BearerIdentity       INTEGER (0 . . . 15)          OPTIONAL,    -- Cond DRB-Setup
    drb-Identity             DRB-Identity,
    pdcp-Config              PDCP-Config                   OPTIONAL,    -- Cond PDCP
    rlc-Config               RLC-Config                    OPTIONAL,    -- Cond Setup
    logicalChannelIdentity   INTEGER (3 . . . 10)          OPTIONAL,    -- Cond LCID
    logicalChannelConfig     LogicalChannelConfig OPTIONAL,             -- Cond Setup
    . . .
}
```

The presence condition LCID of the logicalChannelIdentity indicates: the information element must be present when an associated DRB is established, is selectively present (i.e., either present or non-present) when a bearer type under dual connectivity is changed, and is not allowed to be present under other condition.

applies a logical channel identity configuration when the configuration information contains the logical channel identity configuration; and applies a logical channel configuration when the configuration information contains the logical channel configuration.

```
DRB-ToAddMod ::= SEQUENCE {
    eps-BearerIdentity      INTEGER (0 ... 15)          OPTIONAL,    -- Cond EPS-bearer-ID
    drb-Identity            DRB-Identity,
    pdcp-Config             PDCP-Config                 OPTIONAL,    -- Cond PDCP
    rlc-Config              RLC-Config                  OPTIONAL,    -- Cond Setup
    logicalChannelIdentity  INTEGER (3 ... 10)          OPTIONAL,    -- Cond DRB-Setup
    logicalChannelConfig    LogicalChannelConfig OPTIONAL,           -- Cond Setup
    ...
}
```

In another embodiment, the indication message includes second configuration information for the base station to configure or reconfigure a radio bearer identity corresponding to the bearer; and the method further includes: configuring or reconfiguring a radio bearer identity corresponding to the bearer according to the second configuration information.

Figure 6:
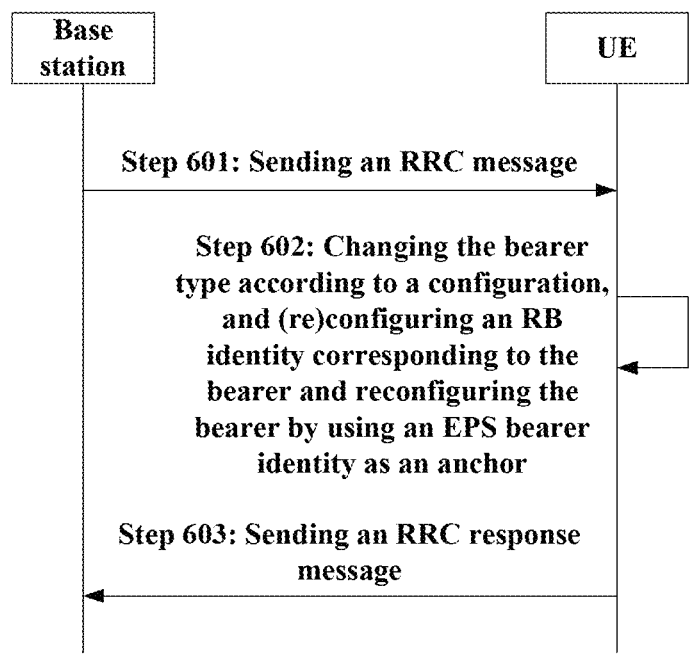
FIG. 6 is a schematic diagram of still another flow of a bearer management method of Embodiment 1 of the present disclosure.

FIG. 6 is a schematic diagram of still another flow of a bearer management method of Embodiment 1 of the present disclosure. As illustrated in FIG. 6, the method includes:

step 601: a base station sends an RRC message for changing a bearer type under dual connectivity, and reconfiguring a bearer of a changed bearer type, the RRC message containing second configuration information that includes information of (re)configuration of an RB identity corresponding to the bearer by the base station;

step 602: the UE receives the RRC message of step 601, changes the bearer type according to a configuration, and (re)configures an RB identity corresponding to the bearer and reconfigures the bearer according to the second configuration information by using an EPS bearer identity as an anchor;

step 603: the UE returns an RRC response message.

In this embodiment, the second configuration information contains eps-BearIdentity in an information element DRB-ToAddMod. In the perspective of the existing protocol, the method is described as follows:

If an EPS bearer identity included in a DRB addition/modification list (DRB-ToAddModList) is in a current configuration of the UE and the bearer is changing the bearer type, then the UE The presence condition EPS-bearer-ID of the eps-BearerIdentity indicates: the information element must be present when an associated DRB is established, is selectively present (i.e., either present or non-present) when a bearer type under dual connectivity is changed, and is not allowed to be present under other condition.

In another embodiment, the indication message includes third configuration information for the base station to configure or reconfigure a PDCP identity corresponding to the bearer; and the method further includes: configuring or reconfiguring a PDCP entity corresponding to the bearer according to the third configuration information.

Figure 7:
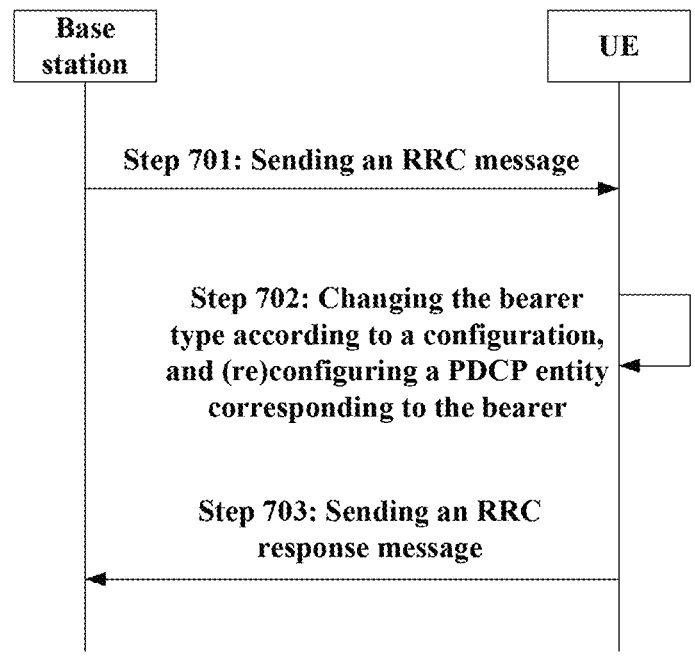
FIG. 7 is a schematic diagram of still another flow of a bearer management method of Embodiment 1 of the present disclosure.

FIG. 7 is a schematic diagram of still another flow of a bearer management method of Embodiment 1 of the present disclosure. As illustrated in FIG. 7, the method includes:

step 701: a base station sends an RRC message for changing a bearer type under dual connectivity, and reconfiguring a bearer of a changed bearer type, the RRC message containing third configuration information that includes information (re)configuration of a PDCP entity corresponding to the bearer by the base station;

step 702: the UE receives the RRC message of step 701, changes the bearer type according to a configuration, and (re)configures a PDCP entity corresponding to the bearer according to the third configuration information; and step 703: the UE returns an RRC response message.

In this embodiment, the third configuration information contains pdcp-Config in an information element DRB-ToAddMod. In the perspective of the existing protocol, the method is described as follows:

```
DRB-ToAddMod ::= SEQUENCE {
    eps-BearerIdentity      INTEGER (0 ... 15)          OPTIONAL,    -- Cond DRB-Setup
    drb-Identity            DRB-Identity,
    pdcp-Config             PDCP-Config                 OPTIONAL,    -- Cond PDCP2
    rlc-Config              RLC-Config                  OPTIONAL,    -- Cond Setup
    logicalChannelIdentity  INTEGER (3 ... 10)          OPTIONAL,    -- Cond DRB-Setup
    logicalChannelConfig    LogicalChannelConfig OPTIONAL,           -- Cond Setup
    ...
}
``` applies a DRB identity to the bearer when the configuration information contains the DRB identity;

applies a PDCP configuration when the configuration information contains the PDCP configuration;

applies an RLC configuration when the configuration information contains the RLC configuration;

The presence condition PDCP2 of the pdcp-config indicates: the information element must be present when an associated DRB is established, is selectively present (i.e., either present or non-present) when a completely configured intra-E-UTRA handover is not used, when a first RRC connection reconfiguration after an RRC connection reestablishment, or when the bearer type changes for UE(s)

configured with dual connectivity, and is not allowed to be present under other condition.

In another embodiment, the indication message includes fourth configuration information for releasing the bearer under dual connectivity.

Figure 8:
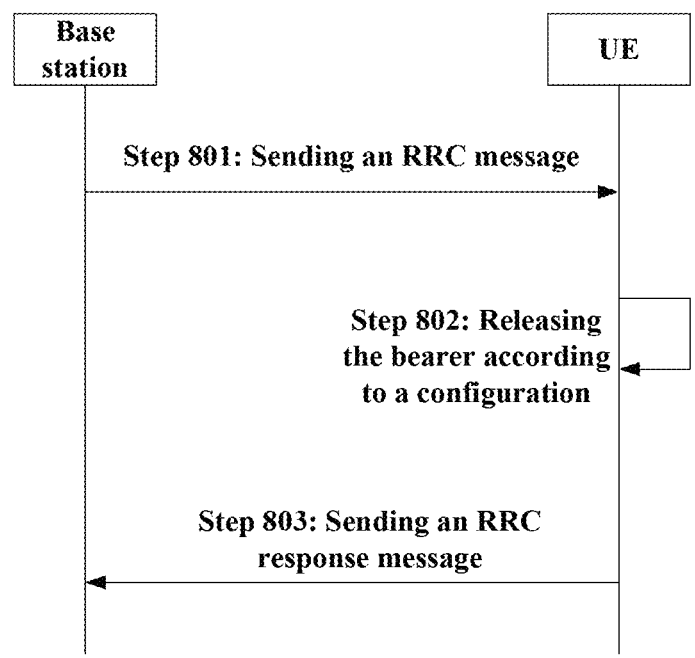
FIG. 8 is a schematic diagram of still another flow of a bearer management method of Embodiment 1 of the present disclosure.

FIG. 8 is a schematic diagram of still another flow of a bearer management method of Embodiment 1 of the present disclosure. As illustrated in FIG. 8, the method includes:

step 801: a base station sends an RRC message for releasing a bearer under dual connectivity, the RRC message containing fourth configuration information that includes release information of the bearer under dual connectivity;

step 802: UE receives the RRC message of step 801, and releases the bearer according to a configuration; and step 803: the UE returns an RRC response message.

In this embodiment, step 802 releases a data radio bearer corresponding to an EPS bearer identity according to the fourth configuration information, when the EPS bearer identity is not contained in the information element DRB-ToAddMod while belonging to a current configuration of the UE configured with dual connectivity; or step 802 releases a data radio bearer corresponding to an EPS bearer identity according to the fourth configuration information, when the EPS bearer identity is not contained in the information element DRB-ToAddMod while belonging to a current configuration of the UE and the indication message is a first RRC connection reconfiguration message after an RRC connection reestablishment, and the UE is configured with dual connectivity.

Specifically, if the EPS bearer identity is not included in a DRB addition/modification list (DRB-ToAddModList) while belonging to a current configuration of the UE configured with dual connectivity, or the message is a first RRC connection reconfiguration message after an RRC connection reestablishment, and the UE is configured with dual connectivity, then the UE releases a DRB corresponding to the EPS bearer identity.

As can be seen from the above embodiment, by receiving an indication message, sent by a base station, for changing a bearer type of a bearer or releasing the bearer under dual connectivity, the UE configured with dual connectivity can seamlessly convert the bearer.

Embodiment 2

Figure 9:
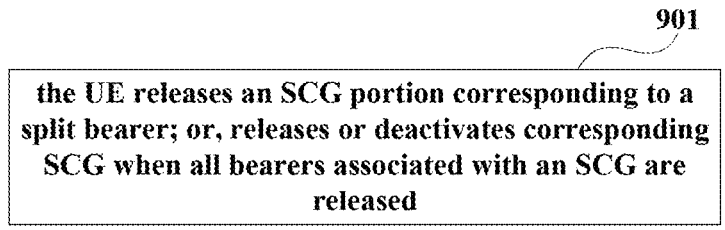
FIG. 9 is a schematic diagram of a flow of a bearer management method of Embodiment 2 of the present disclosure.

This embodiment of the present disclosure provides a bearer management method applied to a UE configured with dual connectivity. FIG. 9 is a schematic diagram of a flow of a bearer management method of Embodiment 2 of the present disclosure. As illustrated in FIG. 9, the method includes:

Step 901: the UE releases a Secondary Cell Group (SCG) portion corresponding to a split bearer; or, releases corresponding SCG resource when all bearers associated with an SCG are released.

In one embodiment, the UE may release the SCG portion corresponding to the split bearer after triggering the RRC connection reestablishment procedure.

Figure 10:
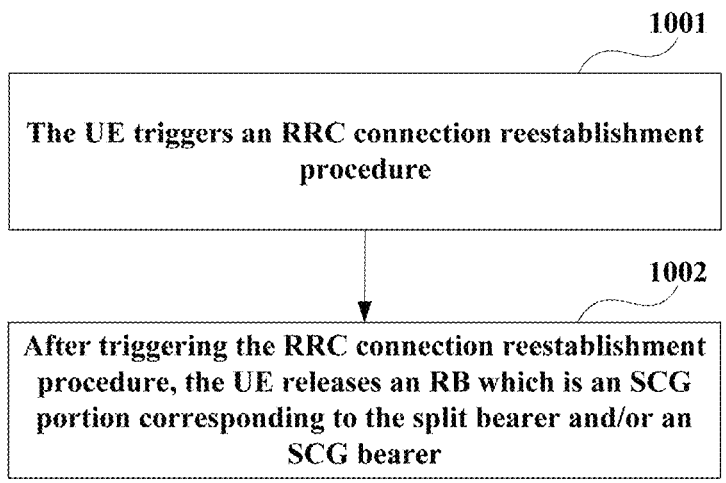
FIG. 10 is a schematic diagram of another flow of a bearer management method of Embodiment 2 of the present disclosure.

FIG. 10 is a schematic diagram of another flow of a bearer management method of Embodiment 2 of the present disclosure. As illustrated in FIG. 10, the method includes:

step 1001: the UE triggers an RRC connection reestablishment procedure; and step 1002: after triggering the RRC connection reestablishment procedure, the UE releases an RB which is an SCG portion corresponding to the split bearer and/or an SCG bearer.

In this embodiment, performing an RRC connection reestablishment procedure for the UE configured with dual connectivity includes: after triggering the RRC connection reestablishment procedure, the UE returns to the traditional single connection mode (i.e., only being connected to the MeNB), which includes releasing configurations associated with the SCG such as a UE identity under the SCG an MAC/PHY configuration corresponding to the SCG an SCG measurement configuration, etc.

Figure 11:
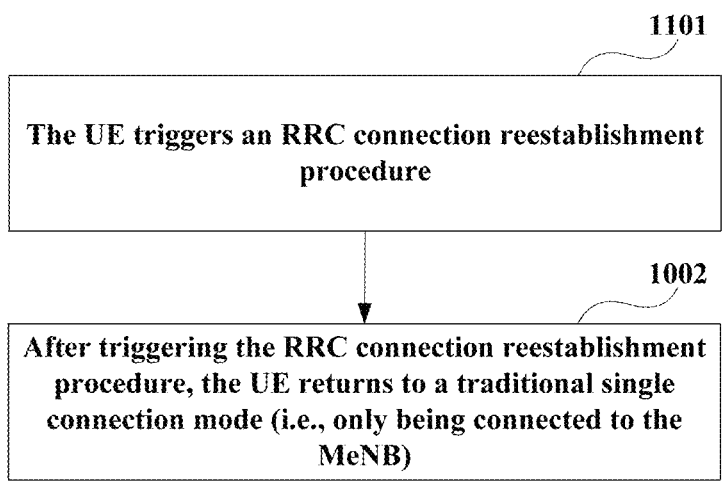
FIG. 11 is a schematic diagram of still another flow of a bearer management method of Embodiment 2 of the present disclosure.

FIG. 11 is a schematic diagram of still another flow of a bearer management method of Embodiment 2 of the present disclosure. As illustrated in FIG. 11, the method includes:

step 1101: the UE triggers an RRC connection reestablishment procedure; and step 1102: after triggering the RRC connection reestablishment procedure, the UE returns to the traditional single connection mode (i.e., only being connected to the MeNB), including: releasing an SCG portion corresponding to the split bearer, associating all the SCG bearers to the MeNB, i.e., associating those SCG bearers to an MAC entity corresponding to the MeNB, and releasing configurations associated with the SCG. The configurations associated with the SCG for example include a UE identity under the SCG an MAC/PHY configuration corresponding to the SCG an SCG measurement configuration, etc.

In another embodiment, when all bearers associated with one SCG are released, the UE voluntarily releases corresponding SCG, releasing the SCG may include releasing the SCG configuration and releasing the SCG resource, etc., but the present disclosure is not limited thereto.

In another embodiment, when all bearers associated with the SCG are released, corresponding SCG may be deactivated. In addition, the corresponding SCG may not include cells of the SCG configured with a PUCCH and having a part of the function of primary cell.

Specifically, when all bearers associated with one SCG are released, the UE voluntarily deactivates corresponding SCG including voluntarily deactivating all Secondary cells (Scells) associated with the corresponding SCG excluding special Scells. The special SCell refers to an SCG cell configured with a PUCCH and having a part of the function of the Primary cell (Pcell).

In another embodiment, when a bearer change from the split bearer to the traditional bearer, or from the split bearer to the MCG bearer occurs, a PDCP entity may be reestablished and/or a sending of a PDCP status report to the MCG may be triggered. In addition, a PDCP data transmission or retransmission may be performed according to the received PDCP status report sent from the network side.

Specifically, when a bearer change from the split bearer to the traditional bearer, or from the split bearer to the MCG bearer occurs, the UE reestablishes a PDCP entity, and/or the UE triggers a sending of a PDCP status report to the MeNB. In addition, the UE may further perform a PDCP data transmission or retransmission according to the received PDCP status report sent from the network side, i.e., perform a transmission or retransmission of PDCP packet indicated by the PDCP status report as still not being acknowledged by the network side.

As can be seen from the above embodiment, by receiving an indication message, sent by a base station, for changing a bearer type of a bearer or releasing the bearer under dual connectivity, the UE configured with dual connectivity can seamlessly convert the bearer.

Embodiment 3

This embodiment of the present disclosure provides a bearer management method applied to a base station connected to a UE configured with dual connectivity.

Figure 12:
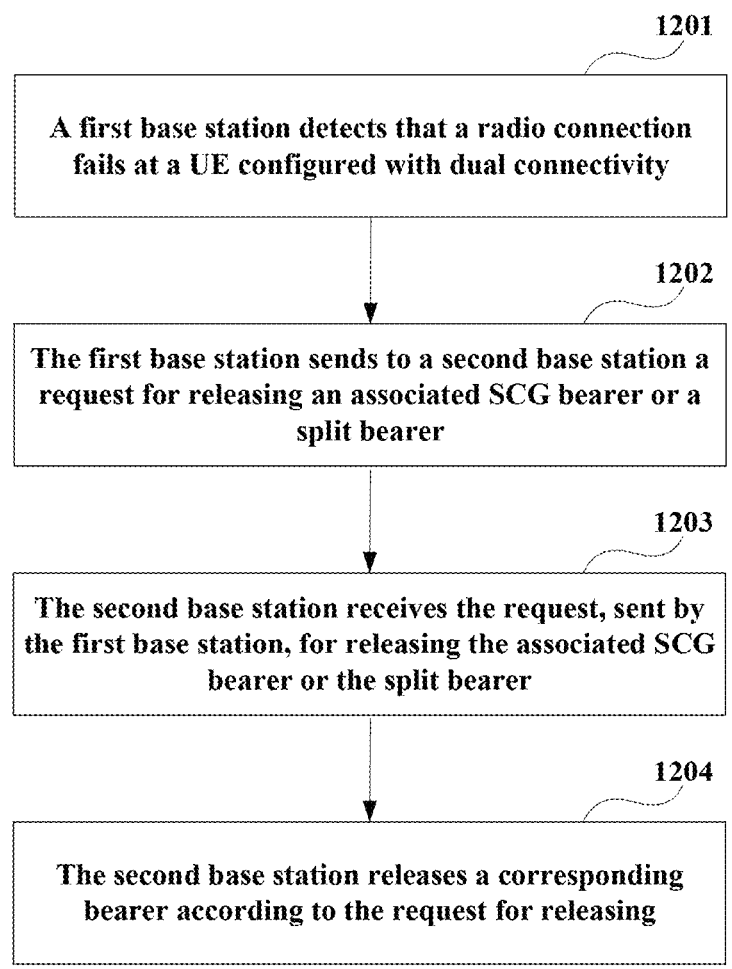
FIG. 12 is a schematic diagram of a flow of a bearer management method of Embodiment 3 of the present disclosure.

FIG. 12 is a schematic diagram of a flow of a bearer management method of Embodiment 3 of the present disclosure. As illustrated in FIG. 12, the method includes:

step 1201: a first base station detects that a radio connection fails at a UE configured with dual connectivity;

step 1202: the first base station sends to a second base station a request for releasing an associated SCG bearer or a split bearer.

As illustrated in FIG. 12, the method further includes:

step 1203: the second base station receives the request, sent by the first base station, for releasing the associated SCG bearer or the split bearer; and step 1204: the second base station releases a corresponding bearer according to the request for releasing.

For example, when detecting that a radio connection fails at the UE configured with dual connectivity, e.g., receiving an RRC connection reestablishment request message or judging a Radio Link Failure (RLF) at the UE, the MeNB sends a request for releasing the associated SCG bearer or the split bearer to the SeNB, the request containing a release reason of User inactivity or Radio Connection With UE Lost. The SeNB releases corresponding bearer.

For another example, when detecting an RLF at the UE configured with dual connectivity, the SeNB sends a request for releasing the associated SCG bearer or the split bearer to the MeNB, the request containing a release reason of User inactivity or Radio Connection With UE Lost. The MeNB returns a response message.

As can be seen from the above embodiment, by releasing the SCG bearer or the split bearer at the base station side, the UE configured with dual connectivity can seamlessly convert the bearer.

Embodiment 4

This embodiment of the present disclosure provides a bearer management apparatus configured in a UE configured with dual connectivity. This embodiment of the present disclosure is corresponding to a bearer management method of Embodiment 1, and the same contents are omitted.

Figure 13:
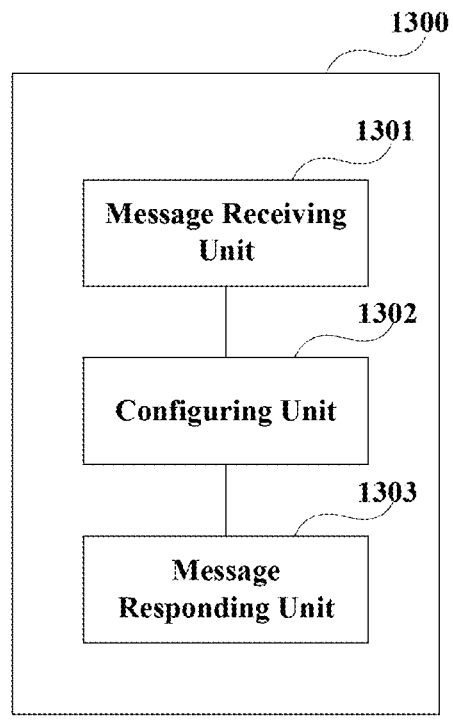
FIG. 13 is a schematic diagram of a structure of a bearer management apparatus of Embodiment 4 of the present disclosure.

FIG. 13 is a schematic diagram of a structure of a bearer management apparatus of Embodiment 4 of the present disclosure. As illustrated in FIG. 13, a bearer management apparatus 1300 includes a message receiving unit 1301 and a configuring unit 1302.

In which, the message receiving unit 1301 is configured to receive an indication message, sent by a base station, for changing a bearer type of a bearer or releasing the bearer under dual connectivity; and the configuring unit 1302 is configured to change the bearer type of the bearer or releases the bearer according to the indication message.

As illustrated in FIG. 13, the bearer management apparatus 1300 may further include a message responding unit 1303 that is configured to send a response message to the base station.

In this embodiment, the indication message may include first configuration information configured or reconfigured by the base station for a logical channel identity corresponding to the bearer, or second configuration information configured or reconfigured by the base station for a radio bearer identity corresponding to the bearer, or third configuration information configured or reconfigured by the base station for a PDCP entity corresponding to the bearer, or fourth configuration information for releasing the bearer under dual connectivity.

In which, the configuring unit 1302 may further be configured to configure or reconfigure the logical channel identity corresponding to the bearer according to the first configuration information, or configure or reconfigure the radio bearer identity corresponding to the bearer according to the second configuration information, or configure or reconfigure the PDCP entity corresponding to the bearer according to the third configuration information.

The configuring unit 1302 may further be configured to release a DRB corresponding to an EPS bearer identity according to the fourth configuration information, when the EPS bearer identity is not contained in an information element DRB-ToAddMod while belonging to the current configuration of a UE configured with dual connectivity; or, release the DRB corresponding to the EPS bearer identity according to the fourth configuration information, when the EPS bearer identity is not contained in the information element DRB-ToAddMod while belonging to the current configuration of the UE, and the indication message including the fourth configuration information is a first RRC connection reconfiguration message after an RRC connection reestablishment, and the UE is configured with dual connectivity.

In this embodiment, the first configuration information contains a logicalChannelIdentity in an information element DRB-ToAddMod, and a logical channel identity corresponding to the logicalChannelIdentity is present when the associated DRB is established; or, the second configuration information contains an eps-BearIdentity in the information element DRB-ToAddMod, and an EPS bearer identity corresponding to the eps-BearIdentity is present when the associated DRB is established; or, the third configuration information includes a pdcp-Config in the information element DRB-ToAddMod, and PDCP information corresponding to the pdcp-Config is present when the associated DRB is established.

In which, a logical channel identity corresponding to the logicalChannelIdentity may also be present when the bearer type changes for UE(s) configured with dual connectivity; or an EPS bearer identity corresponding to the eps-BearIdentity may also be present when the bearer type changes for UE(s) configured with dual connectivity; or PDCP information corresponding to the pdcp-Config may also be present when a completely configured intra-E-UTRA handover is not used, or during a first RRC connection reconfiguration after an RRC connection reestablishment, or the bearer type changes for UE(s) configured with dual connectivity.

This embodiment of the present disclosure further provides a UE including the aforementioned bearer management apparatus 1300.

Figure 14:
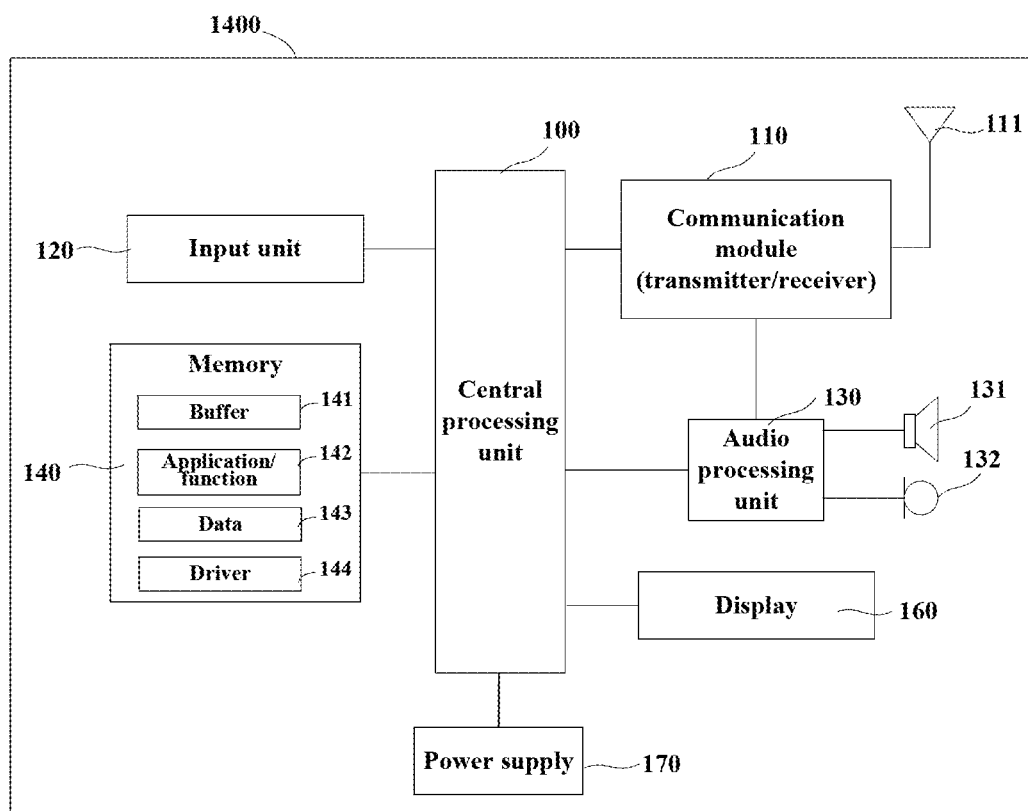
FIG. 14 is a schematic block diagram of a system structure of UE of Embodiment 4 of the present disclosure.

FIG. 14 is a schematic block diagram of a system structure of UE 1400 of Embodiment 4 of the present disclosure. As illustrated in FIG. 14, the UE 1400 may include a Central Processing Unit (CPU) 100 and a memory 140 coupled to the CPU 100. To be noted, the drawing is illustrative, and other type of structure may also be used to supplement or replace the structure, so as to realize the telecom function or other function.

In one embodiment, the functions of the bearer management apparatus 1300 may be integrated into the CPU 100, the CPU 100 may be configured to implement the bearer management method of Embodiment 1.

In another embodiment, the bearer management apparatus 1300 may be configured as being separate from the CPU 100. For example, the bearer management apparatus 1300 may be configured as a chip connected to the CPU 100, and the functions thereof are realized under the control of the CPU.

As illustrated in FIG. 14, the UE 1400 may further include: a communication module 110, an input unit 120, an audio processing unit 130, a display 160, and a power supply 170. To be noted, the UE 1400 does not necessarily include all parts as illustrated in FIG. 14. In addition, the UE 1400 may also include the parts not illustrated in FIG. 14, please refer to the relevant art.

As illustrated in FIG. 14, the CPU 100 sometimes is called as a controller or an operation widget, and it may include a microprocessor or other processor device and/or logic device. The CPU 100 receives an input and controls the operations of respective parts of the UE 1400.

In which, the memory 140 for example may be one or more of a buffer, a flash memory, a floppy, a removable medium, a volatile memory, a nonvolatile memory or any other appropriate device. It can store failure-related information, and a program executing related information. In addition, the CPU 100 can execute the program stored in the memory 140 to store or process information. The functions of other parts are similar to those in the relevant art, and are omitted herein. The parts of the UE 1400 may be implemented by a dedicated hardware, firmware, software or combinations thereof, without deviating from the scope of the present disclosure As can be seen from the above embodiment, by receiving an indication message, sent by a base station, for changing a bearer type of a bearer or releasing the bearer under dual connectivity, the UE configured with dual connectivity can seamlessly convert the bearer.

Embodiment 5

This embodiment of the present disclosure provides a bearer management apparatus configured in a UE configured with dual connectivity. This embodiment of the present disclosure is corresponding to the bearer management method of Embodiment 2, and the same contents are omitted.

Figure 15:
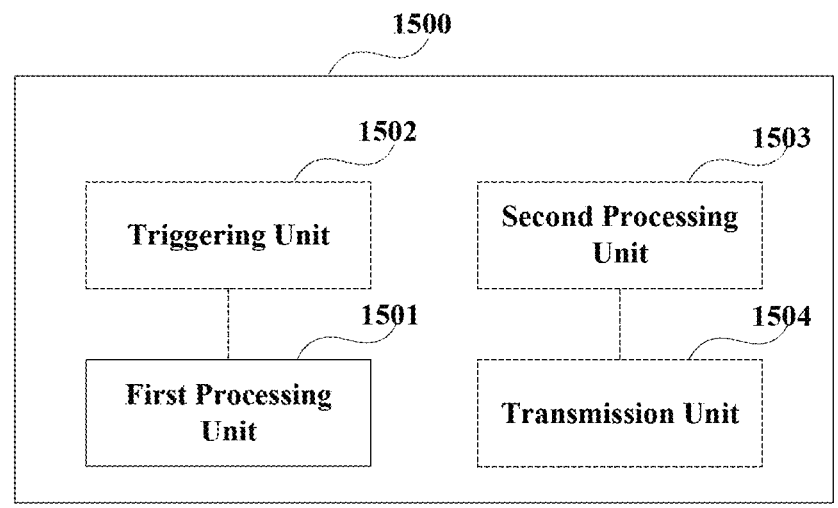
FIG. 15 is a schematic diagram of a structure of a bearer management apparatus of Embodiment 5 of the present disclosure.

FIG. 15 is a schematic diagram of a structure of a bearer management apparatus of Embodiment 5 of the present disclosure. As illustrated in FIG. 15, the bearer management apparatus 1500 includes a first processing unit 1501 that is configured to release an SCG portion corresponding to a split bearer; or, releases or deactivates corresponding SCG when all bearers associated with an SCG are released.

In one embodiment, as illustrated in FIG. 15, the bearer management apparatus may further include a triggering unit 1502 that is configured to trigger an RRC connection reestablishment procedure; after the triggering unit 1502 triggers the RRC connection reestablishment procedure, the first processing unit 1501 is configured to release the SCG portion corresponding to the split bearer and/or an SCG bearer.

In which, the triggering unit 1502 is configured to further release a configuration associated with the SCG Or, the first processing unit 1501 is configured to further associate the SCG bearer with an MAC entity corresponding to an MCG and release a configuration associated with the SCG.

In another embodiment, the first processing unit 1501 is configured to deactivate corresponding SCG when all bearers associated with the SCG are released, the corresponding SCG may not include cells of the SCG configured with a PUCCH and having a part of the function of the primary cell.

In another embodiment, as illustrated in FIG. 15, the bearer management apparatus may further include a second processing unit 1503 that is configured to reestablish a PDCP entity and/or trigger a sending of a PDCP status report to the MCG when a bearer change from the split bearer to a traditional bearer or from the split bearer to an MCG bearer occurs.

As illustrated in FIG. 15, the bearer management apparatus may further include a transmission unit 1504 that is configured to perform a PDCP data transmission or retransmission according to a received PDCP status report sent from a network side.

This embodiment of the present disclosure further provides a UE including the aforementioned bearer management apparatus 1500, please refer to FIG. 14 for the structure of the UE.

As can be seen from the above embodiment, by receiving an indication message, sent by a base station, for changing a bearer type of a bearer or releasing the bearer under dual connectivity, the UE configured with dual connectivity can seamlessly convert the bearer.

Embodiment 6

This embodiment of the present disclosure provides a bearer management apparatus configured in a base station connected to a UE configured with dual connectivity. This embodiment of the present disclosure is corresponding to the bearer management method of Embodiment 3, and the same contents are omitted.

Figure 16:
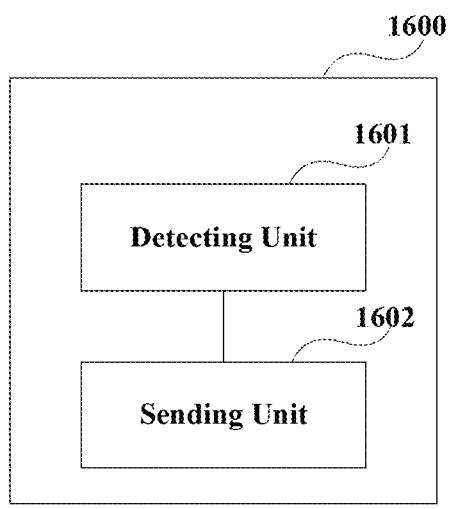
FIG. 16 is a schematic diagram of a structure of a bearer management apparatus of Embodiment 6 of the present disclosure.

FIG. 16 is a schematic diagram of a structure of a bearer management apparatus of Embodiment 6 of the present disclosure. As illustrated in FIG. 16, a bearer management apparatus 1600 includes a detecting unit 1601 and a sending unit 1602, the detecting unit 1601 is configured to detect that a radio connection fails at the UE configured with dual connectivity; and the sending unit 1602 is configured to send to a second base station a request for releasing an associated SCG bearer or a split bearer, so that the second base station releases a corresponding bearer.

Figure 17:
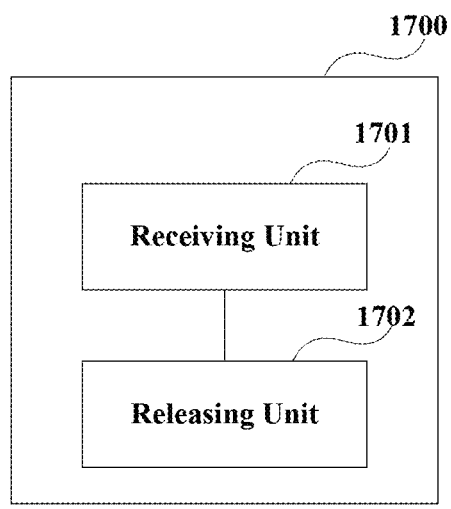
FIG. 17 is a schematic diagram of another structure of a bearer management apparatus of Embodiment 6 of the present disclosure.

FIG. 17 is a schematic diagram of another structure of a bearer management apparatus of Embodiment 6 of the present disclosure. As illustrated in FIG. 17, the bearer management apparatus 1700 includes: a receiving unit 1701 and a releasing unit 1702, the receiving unit 1701 is configured to receive a request, sent by a first base station, for releasing an associated Secondary Cell Group (SCG) bearer or a split bearer; and the releasing unit 1702 is configured to release a corresponding bearer according to the request for releasing.

This embodiment of the present disclosure further provides a base station, including the bearer management apparatus 1600 or the bearer management apparatus 1700 described above.

Figure 18:
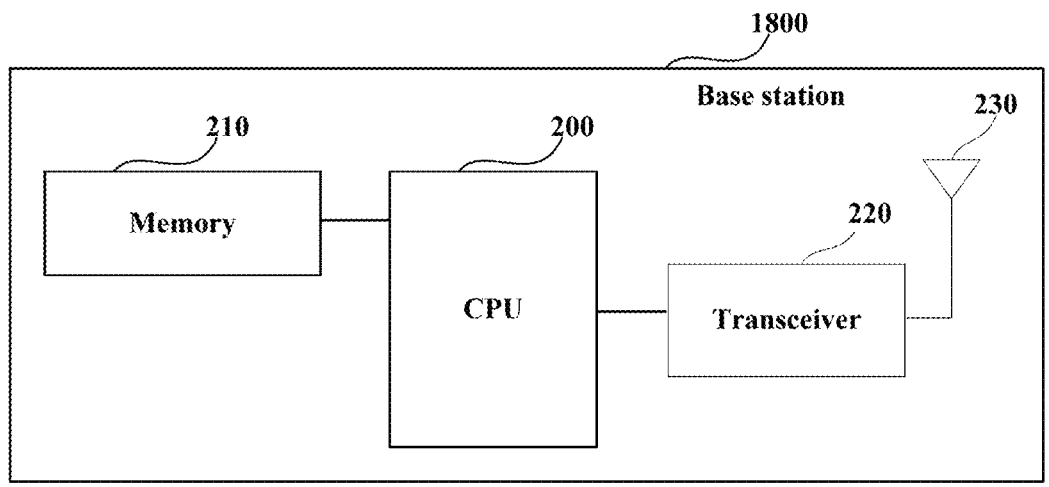
FIG. 18 is a schematic diagram of a structure of a base station of Embodiment 6 of the present disclosure.

FIG. 18 is a schematic diagram of a structure of a base station of Embodiment 6 of the present disclosure. As illustrated in FIG. 18, a base station 1800 may include a CPU 200 and a memory 210 coupled to the CPU 200, the memory 210 may store various data and an information processing program, executes the program under the control of the CPU 200 to receive various information sent from a UE, and sends request information to the UE.

In one embodiment, the functions of the bearer management apparatus 1500 or the bearer management apparatus 1700 may be integrated into the CPU 200 may be configured to implement the bearer management method of Embodiment 3.

In another embodiment, the bearer management apparatus 1600 or the bearer management apparatus 1700 may be configured as being separate from the CPU 200. For example, the bearer management apparatus 1600 or the bearer management apparatus 1700 may be configured as a chip connected to the CPU 200, and the functions thereof are realized under the control of the CPU.

In addition, as illustrated in FIG. 18, the base station 1800 may further include a transceiver 220 and an antenna 230, the functions of these parts are similar to those in the relevant art and are omitted herein. To be noted, the base station 1800 does not necessarily include all the parts as illustrated in FIG. 18. In addition, the base station 1800 may also include the parts not illustrated in FIG. 18, please refer to the relevant art.

As can be seen from the above embodiment, by releasing the SCG bearer or the split bearer at the base station side, the UE configured with dual connectivity can seamlessly convert the bearer.

Embodiment 7

This embodiment of the present disclosure provides a communication system, and the contents the same as those in Embodiments 1 to 6 are omitted.

Figure 19:
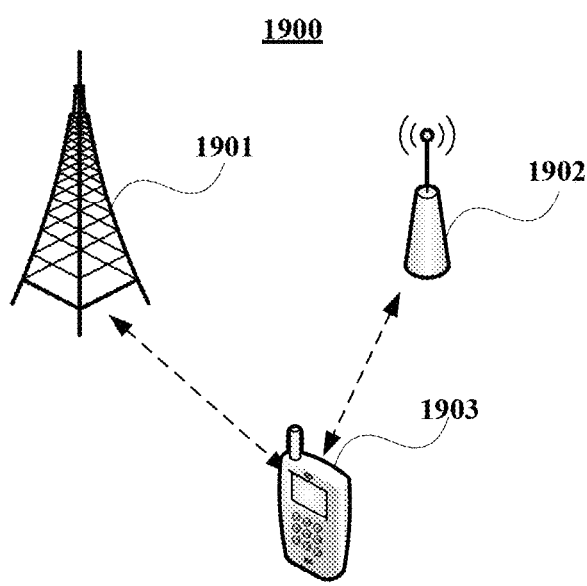
FIG. 19 is a schematic diagram of a structure of a communication system of Embodiment 7 of the present disclosure.

FIG. 19 is a schematic diagram of a structure of a communication system of Embodiment 7 of the present disclosure. As illustrated in FIG. 19, the communication system 1900 includes a first base station 1901, a second base station 1902, and a UE 1903 keeping dual connectivity with the first base station 1901 and the second base station 1902.

In one embodiment, the UE 1903 is configured to receive an indication message, sent by a base station, for changing a bearer type of a bearer or releasing the bearer under dual connectivity; change the bearer type of the bearer or release the bearer according to the indication message; and send a response message to the base station.

In which, the indication message includes first configuration information configured or reconfigured by the base station for a logical channel identity corresponding to the bearer, or second configuration information configured or reconfigured by the base station for a radio bearer identity corresponding to the bearer, or third configuration information configured or reconfigured by the base station for a PDCP entity corresponding to the bearer, or fourth configuration information for releasing the bearer under dual connectivity.

In another embodiment, after triggering the RRC connection reestablishment procedure, the UE 1903 is configured to release an SCG portion corresponding to the split bearer and/or an SCG bearer.

In another embodiment, after all bearers associated with an SCG are released, the UE 1903 is configured to release or deactivate corresponding SCG.

In another embodiment, the first base station 1901 is configured to detect that a radio connection fails at the UE 1903 configured with dual connectivity, and send a request for releasing an associated SCG bearer or a split bearer to the second base station 1902; and the second base station 1902 is configured to receive from the first base station 1901, the request for releasing the associated SCG bearer or the split bearer, and release a corresponding bearer according to the request for releasing.

This embodiment of the present disclosure further provides a computer readable program, when being executed in a UE, the program enables a computer to perform, in the UE, the bearer management method of Embodiment 1 or 2.

This embodiment of the present disclosure further provides a storage medium which stores a computer readable program, the computer readable program enables a computer to perform, in a UE, the bearer management method of Embodiment 1 or 2.

This embodiment of the present disclosure further provides a computer readable program, when being executed in a base station, the program enables a computer to perform, in the base station, the bearer management method of Embodiment 3.

This embodiment of the present disclosure further provides a storage medium which stores a computer readable program, the computer readable program enables a computer to perform, in a base station, the bearer management method of Embodiment 3.

The above devices and methods of the present disclosure may be implemented by hardware, or by hardware in combination with software. The present disclosure relates to such a computer readable program that when the program is executed by a logic unit, the logic unit is enabled to carry out the above devices or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations thereof in the drawings may be implemented as a universal processor, a digital signal processor (DSP), an application-specific integrated circuit (ASIC), a field programmable gate array (FPGA) or other programmable logic devices, discrete gate or transistor logic devices, discrete hardware component or any appropriate combination thereof to perform the functions described in the present disclosure. And they may also be implemented as a combination of computing equipment, such as a combination of a DSP and a microprocessor, multiple processors, one or more microprocessors in communication combination with a DSP, or any other such configuration.

The present disclosure is described above with reference to particular embodiments. However, it shall be understood by those skilled in the art that those descriptions are illustrative only, and not intended to limit the protection scope of the present disclosure. Various variants and modifications may be made by those skilled in the art according to the principles of the present disclosure, and such variants and modifications also fall within the scope of the present disclosure.

What is claimed is:

1. A terminal capable of dual connectivity with a base station, the terminal comprising:
    a processor configured to perform a process that changes a type of a bearer from Secondary Cell Group (SCG) bearer to Master Cell Group (MCG) bearer, releases the bearer, or deactivates the bearer, and triggers transmission of a Packet Data Convergence Protocol (PDCP) status report when a PDCP entity reconfiguration is requested and an associated Radio Link Control (RLC) entity is released for a radio bearer according to the process; and
    a transmitter configured to transmit the PDCP status report.

2. The terminal according to claim 1, further comprising a receiver configured to receive from the base station a control signal that indicates the process, wherein the processor performs the process according to the control signal.

3. The terminal according to claim 2, wherein, the control signal includes a configuration information for a logical channel identity corresponding to the bearer.

4. The terminal according to claim 2, wherein, the control signal includes a logicalChannelIdentity in an information element DRB-ToAddMod, and a logical channel identity corresponding to the logicalChannelIdentity is present.

5. The terminal according to claim 2, wherein, the control signal includes a configuration information for a PDCP entity corresponding to the bearer.

6. The terminal according to claim 2, wherein, the control signal includes a pdcp-Config in an information element DRB-ToAddMod, and PDCP information corresponding to the pdcp-Config is present.

7. The terminal according to claim 1, wherein the processor triggers transmission of the PDCP status report according to the bearer type.

8. The terminal according to claim 1, wherein the processor triggers transmission of the PDCP status report according to the bearer type is changed from a first type to a second type.

9. A base station capable of dual connectivity with a terminal, the base station comprising:
a transmitter configured to transmit to the terminal a control signal that indicates to change a type of a bearer from Secondary Cell Group (SCG) bearer to Master Cell Group (MCG) bearer, release the bearer, or deactivate the bearer; and
a receiver configured to receive from the terminal a Packet Data Convergence Protocol (PDCP) status report that is transmitted by the terminal after the terminal triggers transmission of the PDCP status report when a PDCP entity reconfiguration is requested and an associated Radio Link Control (RLC) entity is released for a radio bearer.

10. The base station according to claim 9, wherein, the control signal includes a configuration information for a logical channel identity corresponding to the bearer.

11. The base station according to claim 9, wherein, the control signal includes a logicalChannelIdentity in an information element DRB-ToAddMod, and a logical channel identity corresponding to the logicalChannelIdentity is present.

12. The base station according to claim 9, wherein, the control signal includes a configuration information for a PDCP entity corresponding to the bearer.

13. The base station according to claim 9, wherein, the control signal includes a pdcp-Config in an information element DRB-ToAddMod, and PDCP information corresponding to the pdcp-Config is present.

14. A wireless system comprising:
a terminal configured to perform a process that changes a type of a bearer from Secondary Cell Group (SCG) bearer to Master Cell Group (MCG) bearer, releases the bearer, or deactivates the bearer, triggers transmission of a Packet Data Convergence Protocol (PDCP) status report when a PDCP entity reconfiguration is requested and an associated RLC Radio Link Control (RLC) entity is released for a radio bearer according to the process, and transmits the PDCP status report; and
a base station configured to receive from the terminal the PDCP status report.

* * * * *